United States Patent
Kunkel et al.

(10) Patent No.: US 9,031,356 B2
(45) Date of Patent: May 12, 2015

(54) APPLYING PERCEPTUALLY CORRECT 3D FILM NOISE

(71) Applicant: Dolby Laboratories Licensing Corporation, San Francisco, CA (US)

(72) Inventors: Timo Kunkel, Campbell, CA (US); Tao Chen, Palo Alto, CA (US); Chun Chi Wan, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 197 days.

(21) Appl. No.: 13/796,950

(22) Filed: Mar. 12, 2013

(65) Prior Publication Data
US 2013/0251241 A1    Sep. 26, 2013

Related U.S. Application Data

(60) Provisional application No. 61/613,338, filed on Mar. 20, 2012.

(51) Int. Cl.
*G06K 9/36* (2006.01)
*G06K 9/00* (2006.01)
*H04N 13/00* (2006.01)

(52) U.S. Cl.
CPC ........ *G06K 9/00201* (2013.01); *H04N 13/0018* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 6,590,573 B1 | 7/2003 | Geshwind | |
| 7,027,659 B1 | 4/2006 | Thomas | |
| 2008/0036853 A1* | 2/2008 | Shestak et al. | 348/51 |
| 2008/0152296 A1* | 6/2008 | Oh et al. | 386/47 |
| 2009/0003728 A1* | 1/2009 | Ernst et al. | 382/285 |
| 2010/0183236 A1 | 7/2010 | Kang | |
| 2011/0199459 A1 | 8/2011 | Barenbrug | |
| 2011/0306413 A1* | 12/2011 | Bickerstaff et al. | 463/31 |
| 2012/0057808 A1* | 3/2012 | Minegishi et al. | 382/298 |
| 2013/0038600 A1* | 2/2013 | Wang | 345/419 |
| 2013/0039597 A1* | 2/2013 | Tian et al. | 382/275 |

FOREIGN PATENT DOCUMENTS

| | | |
|---|---|---|
| WO | 95/15063 | 6/1995 |
| WO | 2011/081646 | 7/2011 |

OTHER PUBLICATIONS

Templin, K., Didyk, P., Myszkowski, K., & Seidel, H. P. (Oct. 2014). Perceptually-motivated Stereoscopic Film Grain. In Computer Graphics Forum (vol. 33, No. 7, pp. 349-358).*

(Continued)

*Primary Examiner* — Sumati Lefkowitz
*Assistant Examiner* — David Perlman

(57) ABSTRACT

Perceptually correct noises simulating a variety of noise patterns or textures may be applied to stereo image pairs each of which comprises a left eye (LE) image and a right eye (RE) image that represent a 3D image. LE and RE images may or may not be noise removed. Depth information of pixels in the LE and RE images may be computed from, or received with, the LE and RE images. Desired noise patterns are modulated onto the 3D image or scene so that the desired noise patterns are perceived to be part of 3D objects or image details, taking into account where the 3D objects or image details are on a z-axis perpendicular to an image rendering screen on which the LE and RE images are rendered.

20 Claims, 12 Drawing Sheets

(56) References Cited

OTHER PUBLICATIONS

DXO: http://www.dxo.com/us/photo/filmpack/product_features, downloaded on Apr. 4, 2013.
http://imagenomic.com/rg.aspx, downloaded on Apr. 4, 2013.
Nik Software Silver Efex Pro User Guide.
http://grubbasoftware.com, downloaded on Apr. 4, 2013.
Lu, C. et al. "Perceived Depth Assessment from Noised Stereo Images" 2010 Third International Joint Conference on Computational Science and Optimization, IEEE Society published on May 1, 2010.
Patterson R. et al. "Viewing Distance Affects Stereoscopic Tilt Created with Spatial Frequency Disparity" Optometry and Vision Science, v. 66, No. 8, 554-7, Aug. 1989 published in USA.

* cited by examiner

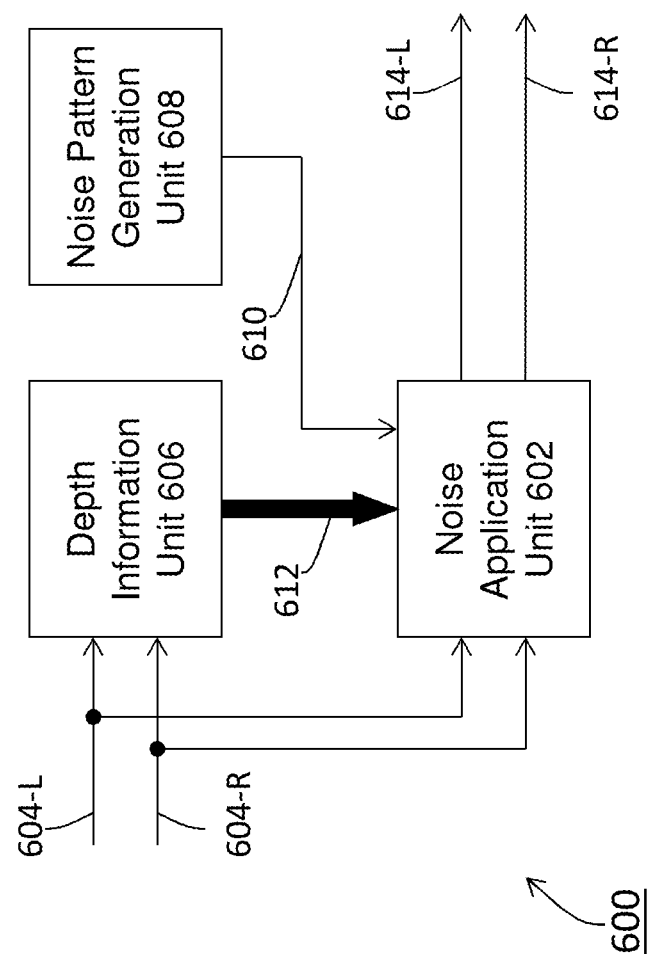

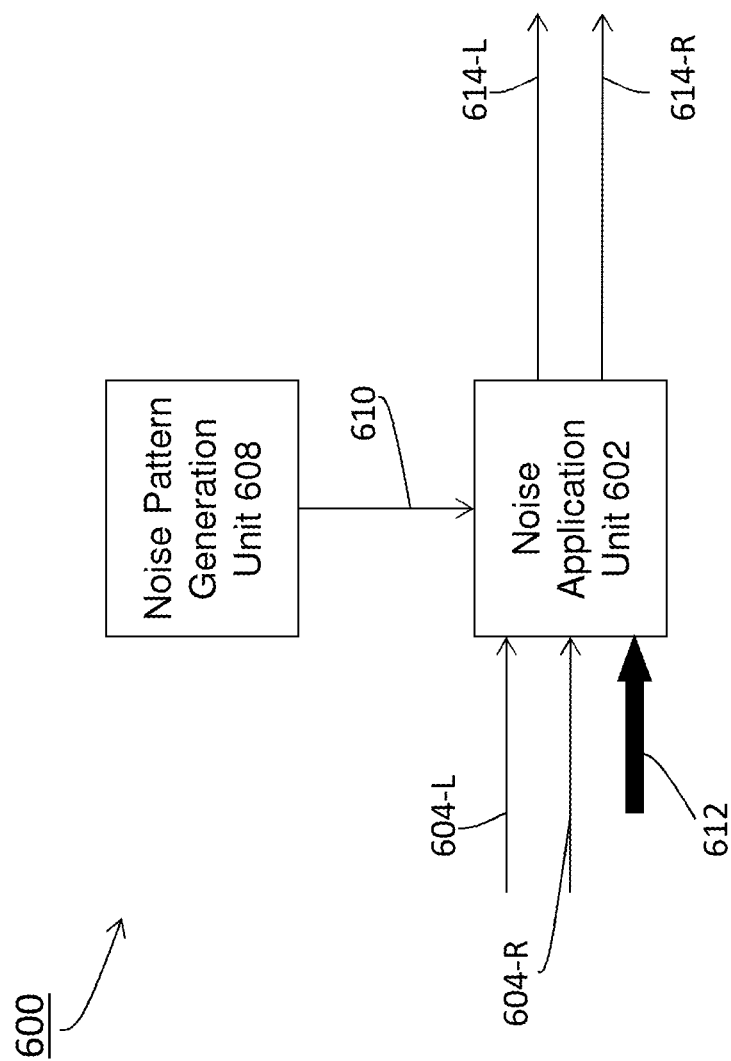

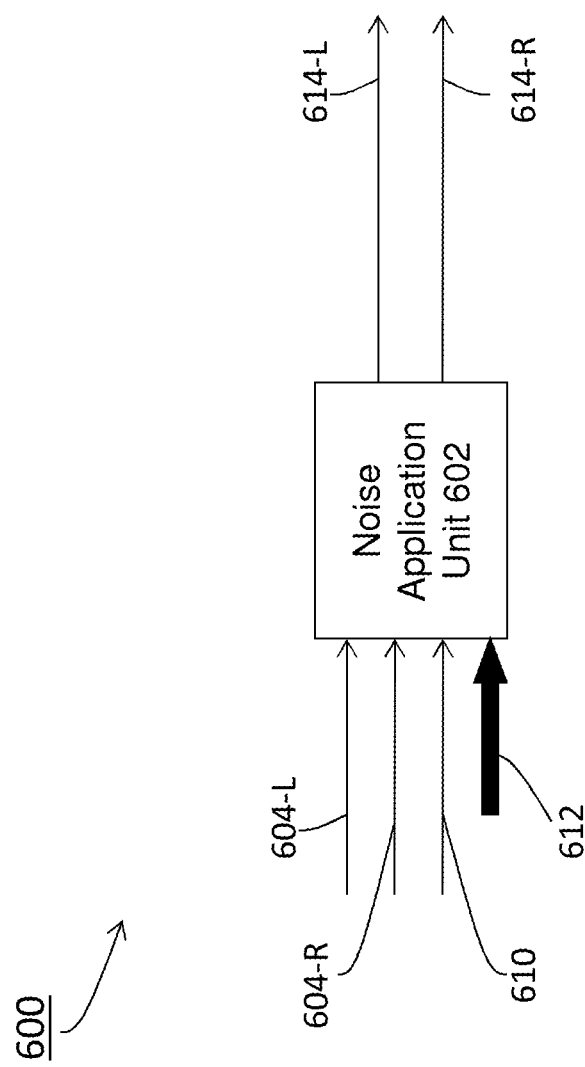

receive a left eye (LE) image and a right eye (RE) image that represent a 3D image 710 determine, based on depth information relating to the LE and RE image, one or more first depths of a first 3D image feature in the 3D image 720 apply one or more noise patterns to the first 3D image feature in the 3D image based on the one or more first depths of the first 3D image feature in the 3D image 730

FIG. 7

APPLYING PERCEPTUALLY CORRECT 3D FILM NOISE

CROSS REFERENCE TO RELATED APPLICATIONS

This application claims the benefit of priority to related, Provisional U.S. Patent Application No. 61/613,338 filed on 20 Mar. 2012 entitled "Applying Perceptually Correct 3D Film Noise" by Timo Kunkel et al., hereby incorporated by references in its entirety.

TECHNOLOGY

The present invention relates generally to imaging systems, and in particular, to imaging systems that process and/or render 3-dimensional (3D) or multi-view images.

BACKGROUND

In general, human eyes perceive 3D images based on the slight (parallactic) disparity of the right eye view and the left eye view by, for example: (i) anaglyph filtering; (ii) linear polarization separation; (iii) circular polarization separation; (iv) shutter glasses separation; (v) spectral separation filtering; (vi) lenticular lens separation; and parallax barrier screening. The illusion of depth can be created by providing an image as taken by a left camera in a stereo camera system to the left eye and a slightly different image as taken by a right camera in the stereo camera system to the right eye. Noises produced by each of the left and right cameras may comprise desirable noises such as film grain simulation of chemical films as well as undesirable noises such as digital noises producing noticeable visual artifacts.

A common problem with 3D image capturing is that each of the left and right cameras in the same stereo camera system may have its own distinct footprint and noise characteristics which typically do not match those of its counterpart camera. As a result, the right eye (RE) image and the left eye (LE) image of a 3D image may comprise noises of different footprints and characteristics. Noise reduction techniques may be applied to the RE and LE images; however, these techniques remove both desirable noise and undesirable noise from the RE and LE images. In addition, resultant 3D images may become too clean to be perceived as realistic.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 6A through FIG. 6D illustrate non-limiting example configurations of an image processing system 600 that applies perceptually correct noises to 3D images, in accordance with an embodiment of the present invention;

FIG. 7 illustrates an example process flow; and

DESCRIPTION OF EXAMPLE POSSIBLE EMBODIMENTS

Figure 1A:
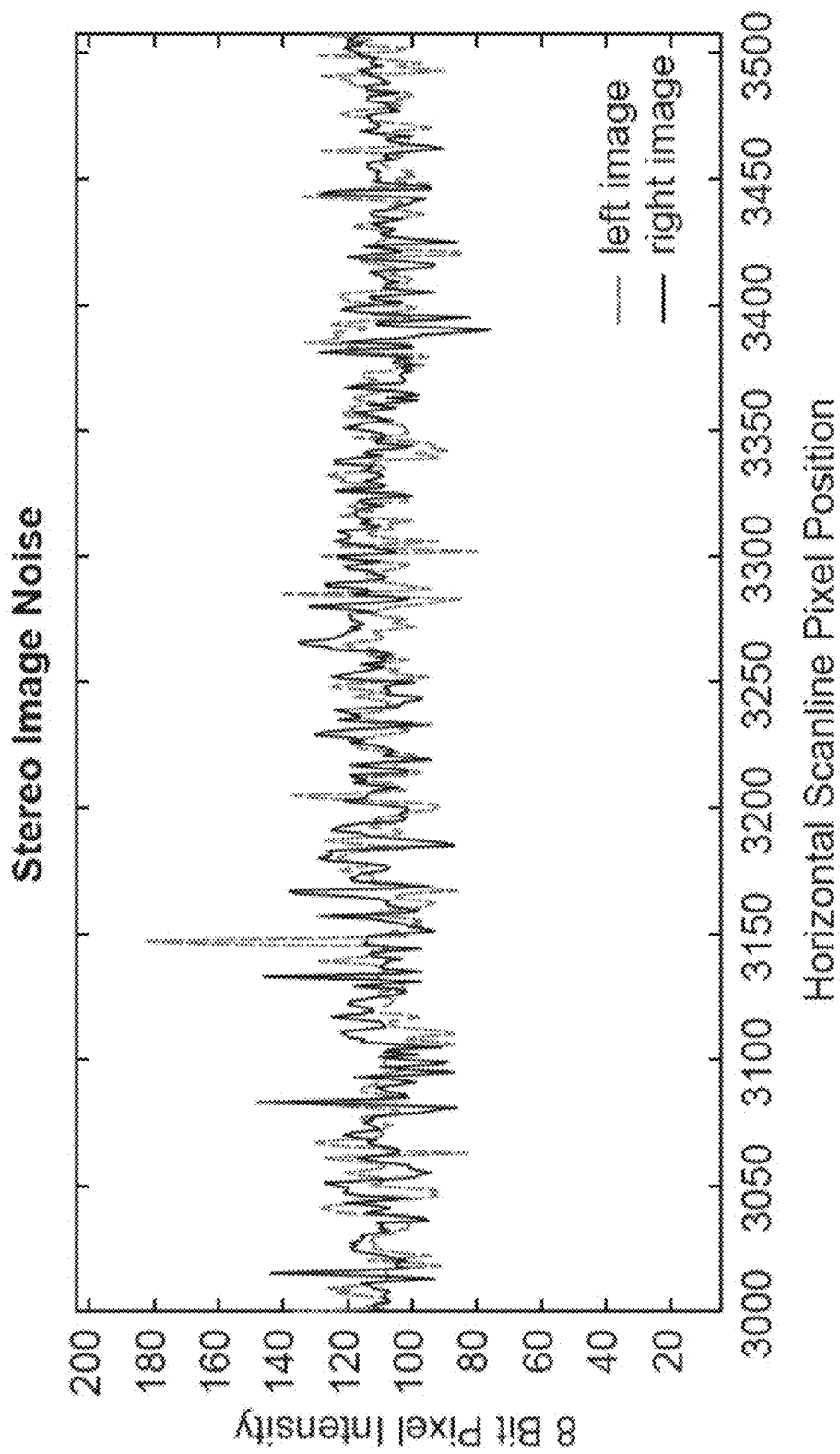
FIG. 1A illustrates noise mismatch in a scanline of an example stereo image pair.

Example possible embodiments, which relate to applying perceptually correct noises, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Example embodiments are described herein according to the following outline (outline section headings are for reference purposes only and shall not in any way control the scope of the present invention):

1. GENERAL OVERVIEW
2. 3D IMAGES
3. PERCEPTUALLY INCORRECT NOISE
4. PERCEPTUALLY CORRECT NOISE
5. NOISE APPLICATION
6. VARYING SPATIAL RESOLUTIONS OF APPLIED NOISE BASED ON DEPTHS
7. SYSTEM CONFIGURATIONS
8. PROCESS FLOW
9. IMPLEMENTATION MECHANISMS—HARDWARE OVERVIEW
10. EQUIVALENTS, EXTENSIONS, ALTERNATIVES AND MISCELLANEOUS

1. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In some embodiments, stereo image pairs processed under techniques as described herein may comprise left eye (LE) images and right eye (RE) images, for example, captured with two different cameras in a multi-view or stereoscopic camera system as analog or digital images. Due to differences in noise-related characteristics of cameras and other influencing factors in image acquisition, noises generated in LE image and the RE image of a stereo image pair are perceptually incorrect, even if the LE and RE images are taken simultaneously or substantially simultaneously (e.g., with a fraction of a cent-second, millisecond, microsecond, etc.). As used herein, "noises in the LE image and the RE image being perceptually incorrect" means that those noises are randomly correlated spatially, or incorrectly correlated spatially. For example, noises introduced in image acquisition may appear as a mist of droplets at or near a plane of a particular depth in a z-axis (which may be perpendicular to an image rendering screen on which the LE image and the RE image are rendered).

In some embodiments, perceptually incorrect noises embedded in (input) LE and RE images are first removed from the LE and RE images. Desired noise patterns may then be applied to the LE and RE images. As used herein, "desired noise patterns or prints" refer to system configured and/or user selected noise patterns or prints that are to be applied to LE and RE images in a perceptually correct manner that takes into account the underlying depth information of 3D image content or details in an 3D image represented by the LE and RE images.

In some embodiments, desired noise patterns are modulated onto the 3D image or scene so that the desired noise patterns are perceived to be part of 3D objects or image details, taking into account where the 3D objects or image details are on the z-axis. Under techniques as described herein, the desired noise patterns as applied to the LE image and the desired noise patterns as applied to the RE image (1) are related to, or derived from, the same system-configured or user-selected desired noise patterns, and (2) are offset between each other with the same depth information (e.g., disparity map, metadata, computed disparity or the like) as that of the 3D objects or image details to which the desired noise patterns are applied. As used herein, a 3D object or image detail refers to a visible/perceptible portion of 3D content in a 3D image represented by one or more corresponding pixels in LE and RE images of a stereo image pair.

In some embodiments, the spatial resolutions of the desired noise patterns may be adjusted based on depth values of 3D objects or image details. For example, to improve the perceptual accuracy, the spatial resolution of a desired noise pattern may be adjusted higher for objects that are close to a viewer and lower for other objects that are further away from the viewer. In some embodiments, this may be implemented by shifting spatial frequencies of the desired noise pattern to higher values or by increasing high spatial frequency components (or decreasing low spatial frequency components) in the desired noise pattern for the objects that are close to the viewer, and by shifting spatial frequencies of the desired noise pattern to lower values or by decreasing high spatial frequency components (or increasing low spatial frequency components) in the desired noise pattern for the objects that are farther away from the viewer.

In some embodiments, adjustments of spatial resolutions of desired noise patterns based on depth values of 3D objects or image details do not have to follow a linear relationship. Instead of using a linear relationship, a non-linear relationship may be used to scale the spatial resolution of a desired noise pattern with the depth values. Under some linear or non-linear relationships, a particular depth value range (e.g., one or more of front, middle, or back regions of the 3D scene) may be overemphasized with even higher spatial frequencies or even more high spatial frequency components, relative to some other linear or non-linear relationships. This may be used to perceive some depths better or to perceive some other depths less for instance leading to complete or partial compression and/or expansion of the depth axis. Overemphasizing with high spatial frequencies and underemphasizing with low spatial frequencies may be used in noise applications whether or not disparity or displacement values for the distance between a coplanar plane and the perceived position of 3D objects are correspondingly increased or decreased using the same relationships for with high spatial frequencies and underemphasizing with low spatial frequencies.

In some embodiments, mechanisms as described herein form a part of an image processing system, including but not limited to: a server, studio system, art director system, image editor, color grading or mastering tool, professional reference monitor, animation system, movie studio system, cameras, TVs, broadcast system, media recording device, media playing device, video projector, screen (e.g., matte screen, gray screen, silver lenticular screen or the like), laptop computer, netbook computer, tablet computer, cellular radiotelephone, electronic book reader, point of sale terminal, desktop computer, computer workstation, computer kiosk, or various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. 3D IMAGES

A 3D image as described herein may be represented by a stereo image pair that comprises an LE image and an RE image. The LE image comprises (LE) pixels that are to be viewed by a viewer's left eye, whereas the RE image comprises (RE) pixels that are to be viewed by a viewer's right eye.

Image features represented in a 3D image may be located at different depths along a z-axis vertical to a coplanar view plane in the 3D image. As used herein, the term "coplanar plane" or "coplanar view plane" refers to an imaginary plane in the 3D image (or scene); LE pixels associated with (e.g., portraying or representing) a feature on the coplanar view plane have zero disparity with corresponding RE pixels associated with the same feature on the coplanar view plan. In contrast, LE pixels associated with features not on the coplanar view plane are horizontally displaced with respect to RE pixels associated with the same features.

A horizontal displacement between a LE pixel and a RE pixel, corresponding to the same point or location of a feature in the 3D image, is represented or characterized by a per-pixel disparity. Values of per-pixel disparity for different pairs of corresponding LE and RE pixels may vary with depths, along the z-axis, of the features represented by the different pairs of LE and RE pixels.

If disparity information between LE pixels and RE pixels is correct, then a viewer is able to correctly perceive the positions, shapes, relative spatial relations of the features represented in the 3D image. On the other hand, if disparity information between LE pixels and RE pixels is incorrect or does not exist, then a viewer is not able to do so.

3. PERCEPTUALLY INCORRECT NOISE

Figure 1B:
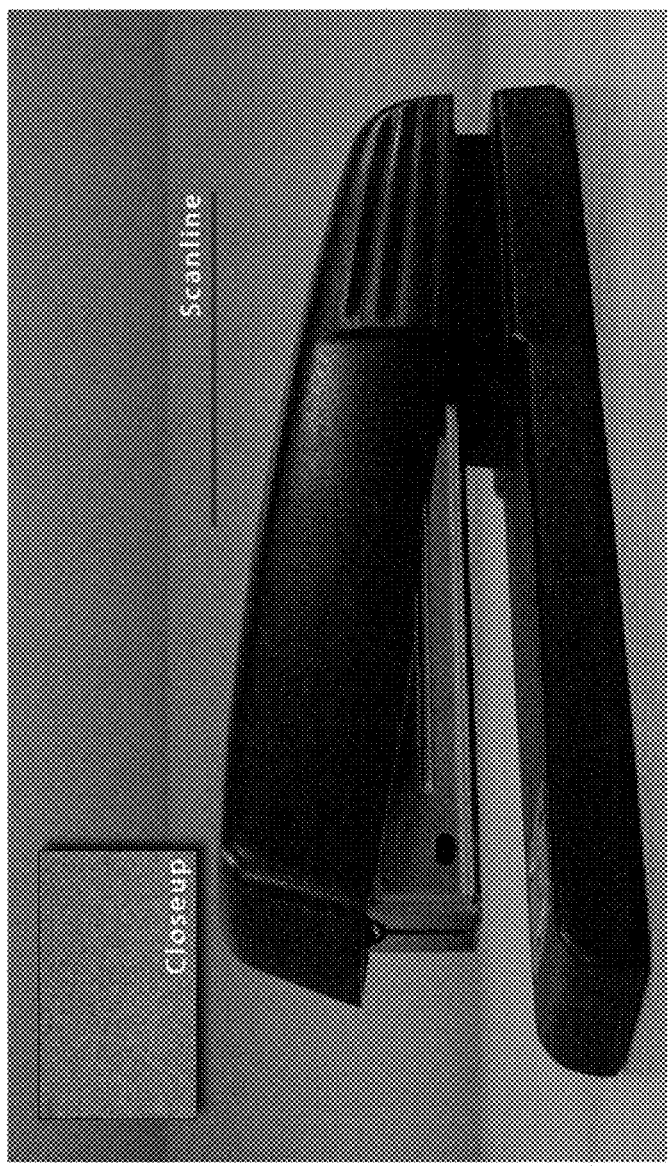
FIG. 1B illustrates an example stereo image pair that may contain a high amount of embedded noise.

FIG. 1A illustrates noise mismatch in a scanline of an example stereo image pair comprising an LE image (frame) and an RE image (frame). The example stereo image pair may be rendered on a display panel or image rendering surface (e.g., in a frame sequence) and perceived by a viewer as a single 3D image as illustrated in FIG. 1B. Example stereo image pair of FIG. 1B may contain a high amount of embedded noise (e.g., image sensor noise, etc.). The scanline of FIG. 1A may be based upon the pixels from the scanline as illustrated in FIG. 1B.

In some embodiments, pixels in the example scanline from one or both of the LE and RE images comprise a high level of noises (e.g., digital sensor noises, etc.) embedded in the LE and RE images. Examples of embedded noises may be, but not limited to any of: intrinsic noises, device specific noises, processing induced noises, compression noises, etc. The noises in the LE and RE images may be perceptually incorrect and may not be correlated with correct disparity information. For example, as illustrated in FIG. 1A, while the stereo image pair is aligned as a viewer perceives, the noise embedded in the LE and RE images do not spatially match or correlate between left and right image. This spatial mismatch of the noise intensities causes errors in disparity information or depth information for pixels affected by the noises, and thus depth noises in the 3D image.

Figure 2:
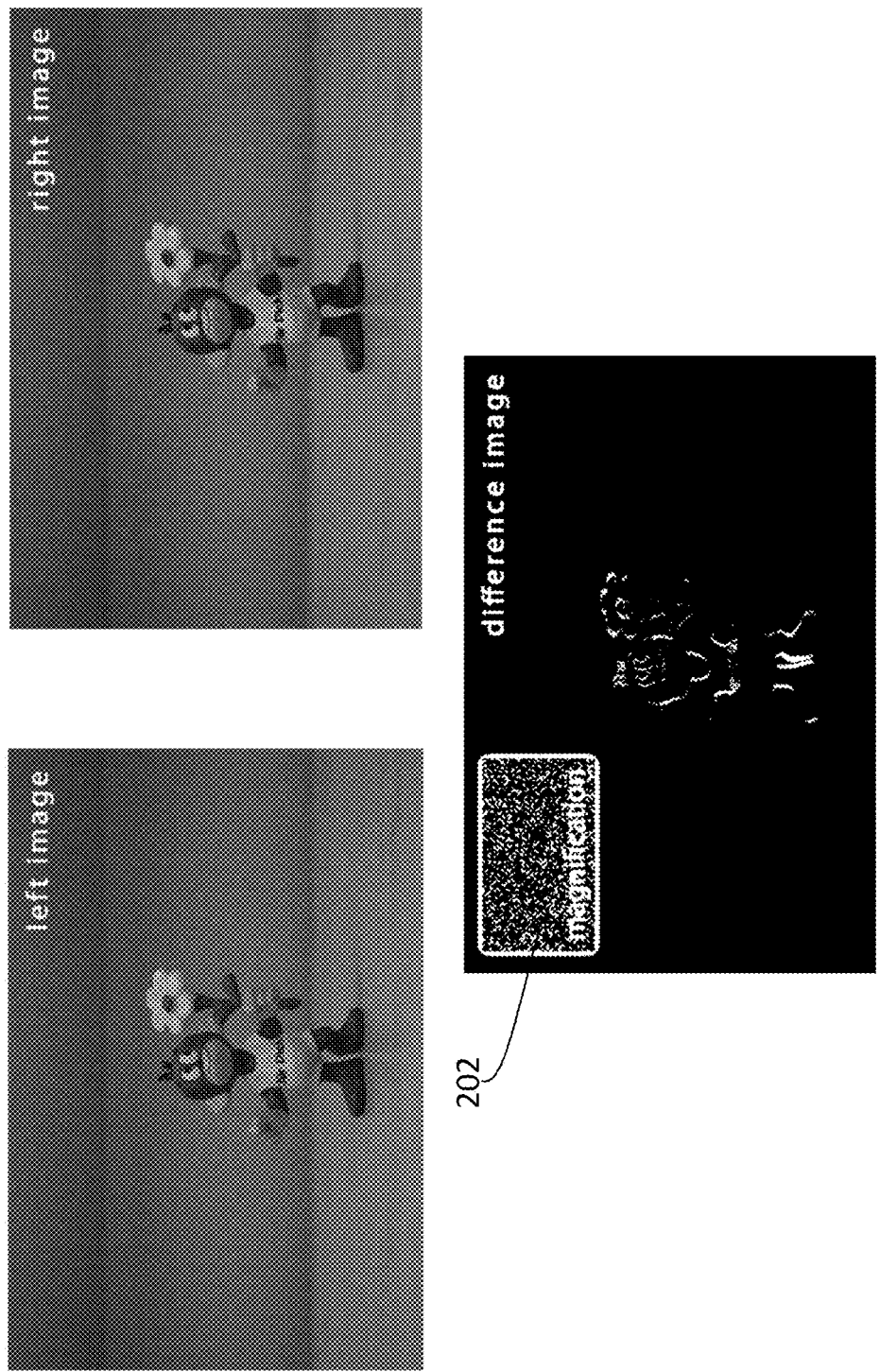
FIG. 2 illustrates example depth noises caused by spatial mismatch of noise intensities in a stereo image pair.

FIG. 2 illustrates example depth noises caused by spatial mismatch of noise intensities in an example stereo image pair as illustrated in FIG. 1A and FIG. 1B. As shown, the LE and RE images may comprise correct disparity information that allows a viewer to perceive a figure holding a flower branch with correct depth information of the features of the figure and the flower branch and their relative spatial relationship. However, the LE and RE images comprise visible noises (202) that are not related with correct depth information or disparity information. The visible noises (202) may represent a magnified noise pattern from an actual 3D image. These visible noises (202) may be perceived as unrelated to, or away from, the figure and the flower. While the figure and the flower branch may be around a particular viewing plane with a particular depth in the z-axis, the visible noises (202) over the figure and the flower branch may appear away from the figure and the flower branch, and may be around a different viewing plane with a different depth in the z-axis. The visible noises (202) may be centered at or near the coplanar viewing plane or an accommodation plane to which a viewer's perception tends to accommodate or accustom. As a result, these noises (202) do not convey desired noise patterns such as film grain with correct depth information in any correlation with the objects or figures in the 3D image; instead, a viewer of the 3D image may perceive these noises (202) as some visible extraneous matter floating in front of, or behind, the portrayed figure and flower branch. While 3D objects or images may be into or out of the screen in a 3D image, the noises may nevertheless still appear at the screen or at a depth at which the viewer's perception tends to accommodate as mist of droplets. As a result, these noises (202) may be very distracting to the viewer and may severely confuse the human visual system (HVS) leading to nausea and headaches.

4. PERCEPTUALLY CORRECT NOISE

In some embodiments, noises embedded in a stereo image pair may be first removed and then a desired noise pattern may be applied to both LE and RE images in the stereo image pair.

Applied noises as described herein may refer to any kind of perceptible pattern or texture including film grains (e.g., simulating those of ISO 1600 chemical films), watermarks (which, for example, indicates that the images are provided for previewing purposes only), etc.; here, the applied noises injected into an LE and RE images of a stereo image pair is correlated. A noise portion in the applied noises may be applied to an image feature (or a portion thereof) at a certain z-value or depth (e.g., slightly, perceptibly, etc.) to make the image feature (or the portion thereof) go up and down, left and right, or in and out spatially. Additionally, optionally, or alternatively, a noise portion in the applied noises may alter luminance of an image feature (or a portion thereof) at a certain z-value or depth from bright to dark, from dark to bright. Additionally, optionally, or alternatively, a noise portion in the applied noises may vary the color of an image feature (or a portion thereof) at a certain z-value or depth. Such a noise portion may be applied to the LE image and the RE image in the form of two correlated noise portions that are derived or built from the former noise portion with appropriate displacement or depth information in between the correlated noise portions.

Since clean images without noises may be perceived as unreal or surreal, applied noises as described herein may also be used to make images to be perceived as realistic images. Applied noises as described herein may simulate a variety of response curves, saturation properties, noise properties, etc., as related to one or more of a variety of media or devices. The distribution properties of applied noises as described herein may include, but are not limited to, uniform distribution, regular distribution, random distribution, Gaussian distribution, distribution patterns of one or more of other types of probability density functions (PDFs), etc.

In some embodiments, applied noises are specified with transfer functions; to apply the noises, existing or noise-removed pixel values in a stereo image pair of an LE image and an RE image may be transformed with one or more of the transfer functions. The transfer functions as applied to the LE image and the RE image may be spatially modified, respectively for the LE image and the RE image, by displacement or disparity information relating to depth values of 3D image objects onto which the noises are applied.

Applied noises as described herein may comprise intensity variations, color variations, halos, and other possible color or luminance noise effects. In some embodiments, noises may be applied to bright areas (e.g., on 3D objects or image features) differently from how noises may be applied to dark areas in order to simulate analogous chemical properties of silver, color layers, etc.

Applied noises as described herein may also be generated based on embedded noises or noise properties thereof. In an example, input image data (e.g., a 3D image sequence comprising a sequence of stereo image pairs) may comprise image metadata, in addition to image data samples; the image metadata may specify/suggest a particular type of noise to be applied to a particular 3D image or frames. In another example, existing non-perceptual 2D noises may be removed and analyzed to determine a particular noise pattern to be combined with depth information for the purpose of applying the particular noise pattern as perceptually correct 3D noises.

Thus, techniques as described herein may be used to convert non-perceptual sensor noises or device specific noises into perceptually correct noises in 3D images or scenes. These techniques may be used, for example, to simulate sensor noises or specific looks of a specific device. Noise application as described herein may use one or more of sampling techniques, modeling techniques, techniques based on matrix, textural patterns, computer-generated graphics, wood textures, other material textures, etc. Applied noises as described herein also may be provided at least in part by an external noise source to an image processing system (e.g., 600 of FIG. 6C), instead of generating wholly by the image processing system.

As noted above, in some embodiments, embedded noises are first removed or reduced in an input stereo image pair. However, in some other embodiments, this noise removing step may be skipped (e.g., with an input stereo image pair comprising clean images with little or no embedded noises, or in a scenario in which embedded noises in input images are not removed).

Images with noises may consume more bandwidth than clean images. Thus, in some embodiments, clean images are provided to an image processing system such as a TV; the image processing system may apply desired noise patterns or prints as appropriate. The TV may store a plurality of noise patterns and may select one or more of the stored patterns based on image metadata. The TV may be configured to analyze input images and compute depth information based on the results of analyzing the input images. Additionally, optionally, or alternatively, depth information may be given as a part of image metadata to the TV, which may apply the received depth information with a particular noise pattern or print without analyzing the input images for the purpose of computing the depth information thereof. Additionally, optionally, or alternatively, the global spatial distribution provided e.g. by metadata can be scaled, distorted, skewed or otherwise manipulated as a function of the observers distance to the display unit by using methods such as head-tracking, eye-tracking, laser scanning, depth imaging, etc. This ensures that the noise always has the same retinal spatial frequencies independent of the observer's distance to the display.

5. NOISE APPLICATION

Noise application may be performed for the whole image sequence, for whole images, for parts of images, for a feature film but not to a commercial break, etc. For example, a desired noise pattern or print may be applied to a particular 3D object or figure (e.g., a weather forecaster) but not to other image details surrounding the particular 3D object or figure. In a further example, the particular 3D object or figure may also be used for image superimposition purposes in 3D video/image applications. In some embodiments, a user may provide user input (through a remote, input device, keypad, etc.) to specify whether media content should be treated with perceptually correct noises as described herein. Additionally, optionally, or alternatively, the user may also provide user input to specify various properties (e.g., amount, one of multiple noise patterns, etc.) of the noises to be applied to the media content.

Techniques as described herein may be used to apply desired noise patterns or prints to images related to virtual reality, 3D mapping applications, captured at film planes by image sensors, etc., so long as depth information (which may include but is not limited to volumetric or stereoscopic information) related to these images may be determined. Techniques as described herein may be used in color grading processing.

Figure 3:
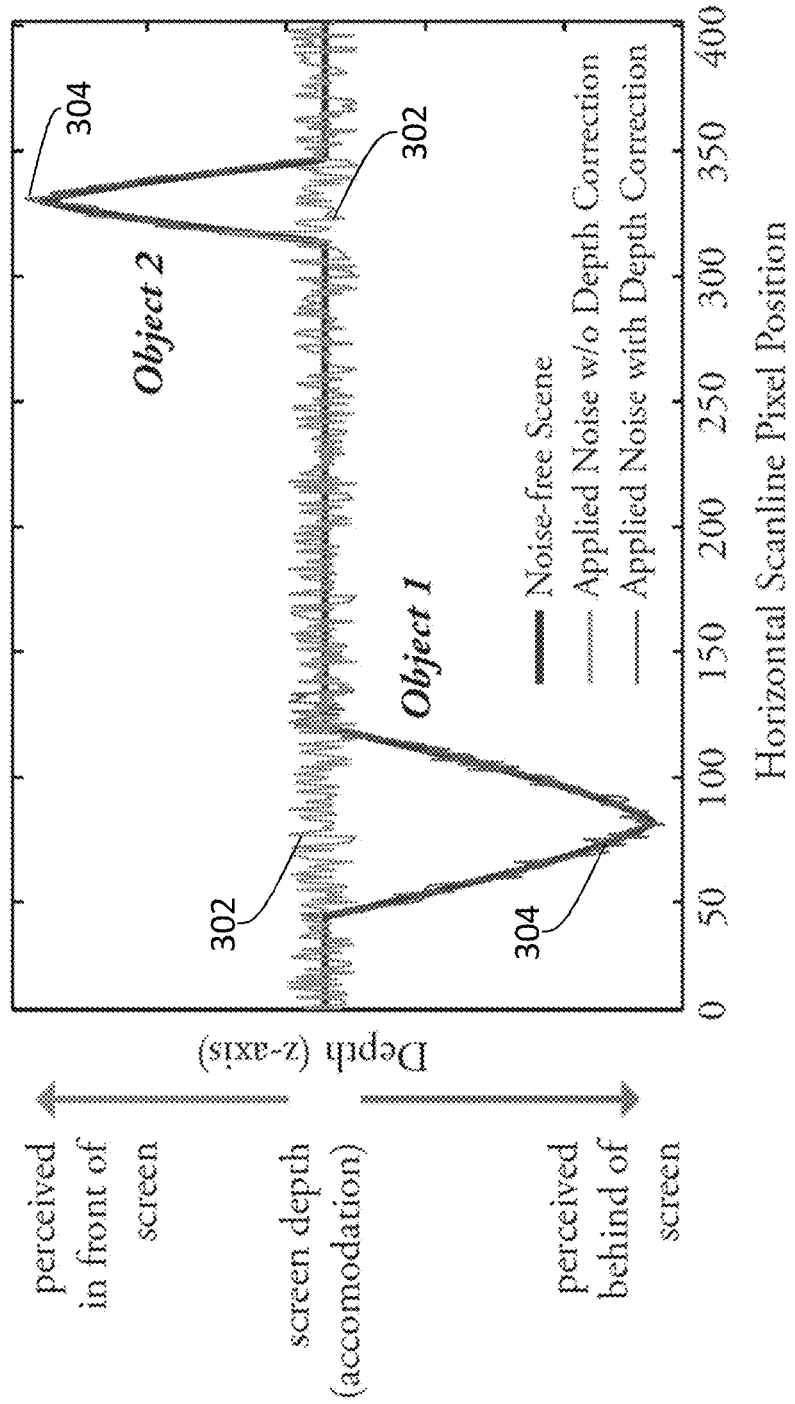
FIG. 3 illustrates applying a desired noise pattern applied under other approaches and under techniques as described herein.

FIG. 3 illustrates a desired noise pattern applied under other approaches and a desired noise pattern applied under an approach that uses techniques as described herein. For the purpose of illustration only, in FIG. 3, a solid contour with two wedge shapes represents depth information of image features portrayed in the 3D image, while rapidly changing wave forms represent applied noises overlaid onto the 3D image under the other techniques and under the techniques as described herein. The image features in the 3D image or scene may be located at different depths. As illustrated, object 1 may be behind an accommodation plane; object 2 may be in front of the accommodate plane; other image features may or may not be located at the accommodation plane.

As used herein, the accommodate plane may refer to a plane at which noises are applied under other approaches that do not use techniques as described herein. Examples of the accommodation plane may include but are not limited to a coplanar plane, a plane corresponding to an image rendering screen (e.g., projection screen) as illustrated in FIG. 3, a plane at a depth where a viewer's vision tends to accommodate, etc.

Under other approaches, applied noise (302) appears to lie at or near one or more specific planes such as the accommodation plane of FIG. 3, regardless of where image details may be located. As illustrated in FIG. 3, for image details located at the accommodation plane, noises (302) are applied at the accommodation plane. Similarly, for image details (e.g., object 1 and object 2) not located at the accommodation plane, noises (302) are still applied at the same accommodation plane. Thus, the noises (302) may appear floating away from the image details (object 1 and object 2). Applied noises (302) may appear in front of object 1 but behind object 2. For the same reasons as discussed with noises embedded within the stereo image pair, the applied noise (302) under the other approaches is prone to cause perceptual confusion for the HVS.

In contrast, under an approach adopting techniques as described herein, applied noise (304) may be modulated with 3D depth information specific to the 3D image or scene represented by the stereo image pair. For example, the applied noise (304) may be modulated with depth information to cause the applied noise (304) to be on top of, coincide, or substantially coincide, with 3D elements or image features in the 3D image or scene. As illustrated in FIG. 3, applied noises (304) are co-located with the image details whether the image features are at the accommodation plane, or not at the accommodation plane. Specifically, for noises (304) applied to object 1 and object 2, they are set with the same depth information with the image features corresponding to object 1 and object 2. As a result, extraneous visible artifacts caused by depth noises are avoided under techniques as described herein In some embodiments, applied noises are created with, or represented by, one or more noise patterns. In an example, the accommodation plane may be a coplanar view plane where LE pixels and corresponding RE pixels portraying image features at the coplanar view plane have zero disparity values. Other LE pixels and other corresponding RE pixels portraying image features at a different depth from that of the coplanar view plane may have non-parity values.

In some embodiments, disparity values of pixels in an LE or RE image (or frame) are expressed as offsets to corresponding pixels in a reference image. As used herein, pixels from images of different views (LE, RE, or reference) correspond to one another if the pixels represent the same image features in a 3D image or scene. In some embodiments, one of the LE or RE images may be set as the reference image; thus, pixels in the reference image have zero offsets; some pixels in the other (e.g., non-reference image, etc.) of the LE or RE images have zero offsets if the pixels represent image features in the coplanar view plane; and some other pixels in the non-reference image have non-zero offset if the pixels represent image features not in the coplanar view plane. In some embodiments, an image with a different view (e.g., center view, an intermediate view between the views associated with the LE or RE images, etc.) may be set as the reference image; thus, some pixels in the LE and RE images have zero offsets if the pixels represent image features in the coplanar view plane; and some other pixels in the LE and RE images have non-zero offset if the pixels represent image features not in the coplanar view plane.

Under techniques as described herein, a noise pattern applied to the 3D image or scene is adjusted with appropriate offsets in the LE and RE images so as to perceptually lie on top of 3D objects and image features which may or may not be located at the accommodation depth (e.g., the depth of the accommodation plane). In some embodiments, the noise pattern may be applied to a reference image. The noise pattern in the reference image is then adjusted with the same offsets as the underlying pixels.

In some embodiments, varying offsets of different noise portions of the noise pattern in the LE and RE images perceptually move these different noise portions to different positions on the z-axis. In some embodiments, these different noise portions match the positions on the z-axis of 3D objects or image details so as to perceptually lie on the 3D objects or image details.

For example, if a pixel in the reference image corresponds to a pixel in an LE or RE image with a certain offset, then a noise portion (e.g., a portion of the noise pattern) applied to the pixel in the reference image is adjusted with the same offset so as to perceptually lie on top of the corresponding pixel in the LE or RE image.

In some embodiments, only noise portions that applied to image features at the accommodation depth are given zero offset; thus, these noise portions in the LE image match the same noise portions in the RE image. On the other hand, other noise portions that applied to image features not at the accommodation depth are given non-zero offsets in non-reference image(s); thus, these noise portions in the LE image do not match the same noise portions in the RE image.

6. VARYING SPATIAL RESOLUTIONS OF APPLIED NOISE BASED ON DEPTHS

Applied noises as described herein may comprise a set of spatial frequency components at different spatial frequencies, which are in a frequency domain transformed from a spatial domain comprising values in x and y axis of the reference image. Here, the x and y axis may refer to pixel columns and rows on a display panel or image rendering screen. In some embodiments, the magnitudes of the spatial frequency components in the applied noises may vary as a function of depth. This function may be piece-wise, linear, non-linear, analytical, non-analytical, table-driven, etc. In some embodiments, if an object is closer to an observer, the spatial frequencies of the applied noise may be set higher. Similarly, if an object is farther away from the observer, the spatial frequencies may be set lower.

Figure 4:
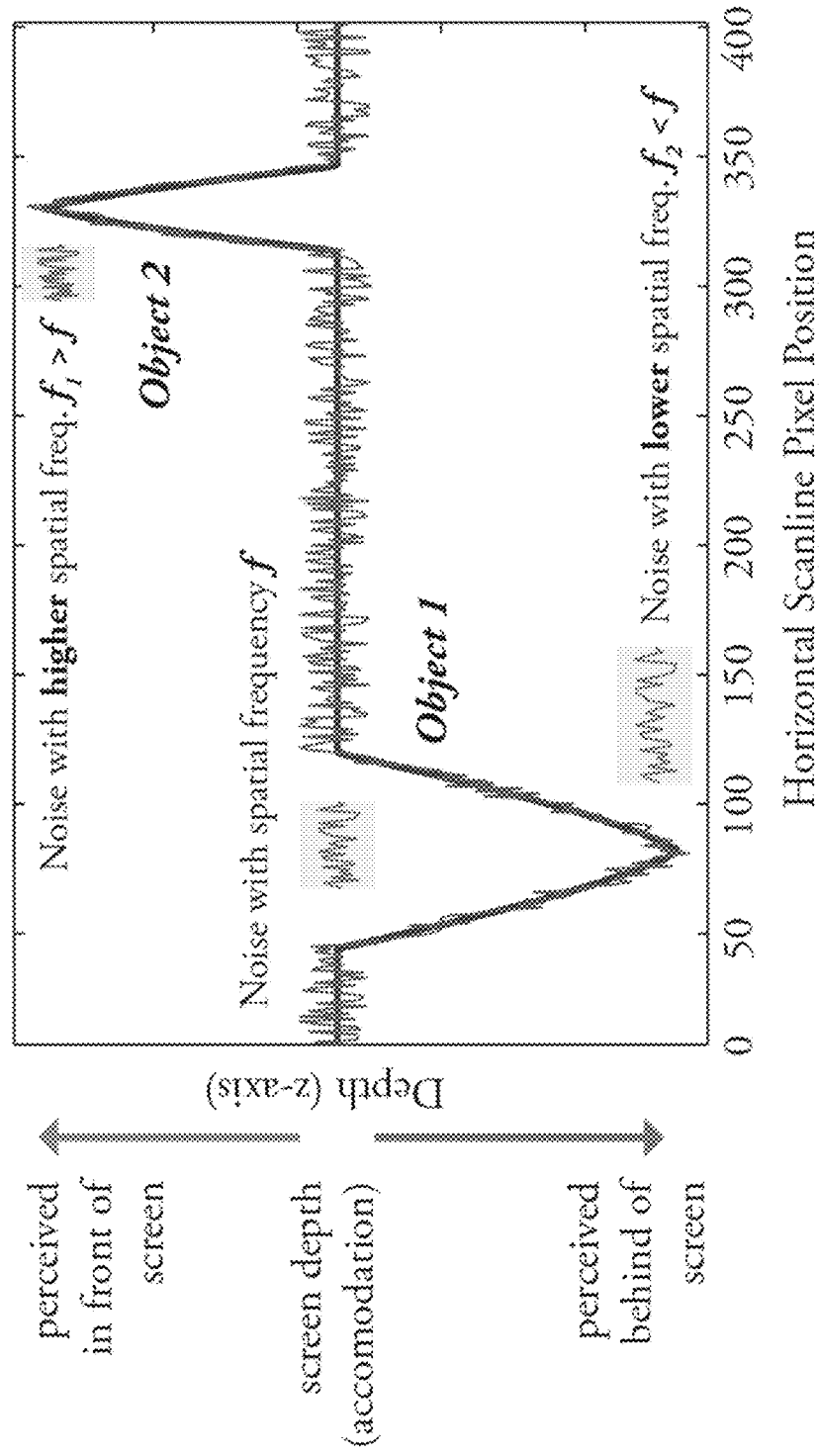
FIG. 4 and FIG. 5 illustrate example adjustments of spatial frequency components of applied noise as a function of depth (z-axis)

FIG. 4 illustrates example adjustments of spatial frequency components of applied noise as a function of depth (z-axis). As illustrated, the closer a 3D object or image detail is to the viewer in the scene, the higher the spatial frequency of the applied noise. This may be accomplished by increasing or shifting spatial frequencies of the spatial frequency components and/or by increasing weights of high spatial frequency ones of the spatial frequency components. On the other hand, the farther away a 3D object or image detail is to the viewer in the scene, the lower the spatial frequency of the applied noise. This may be accomplished by decreasing or shifting spatial frequencies of the spatial frequency components and/or by decreasing weights of high spatial frequency ones of the spatial frequency components.

Figure 5:
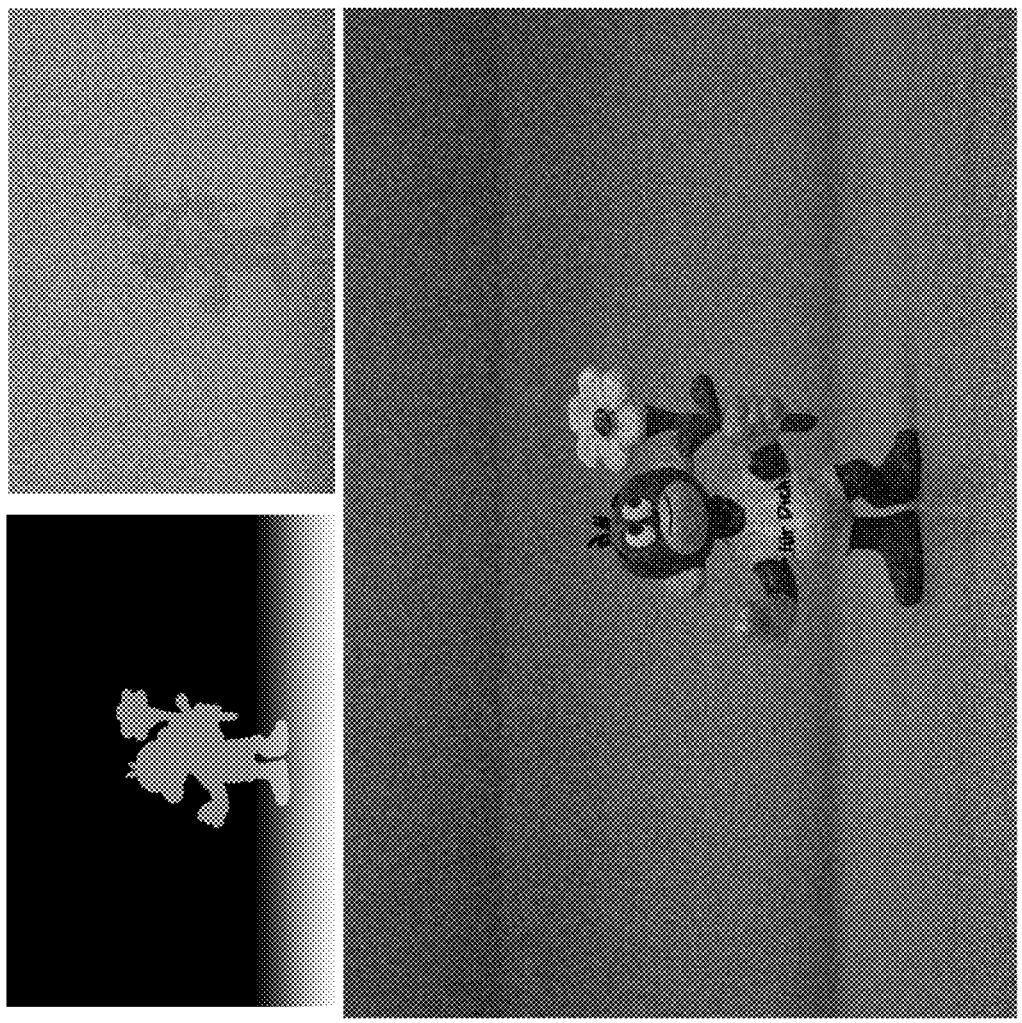

FIG. 5 shows an example simulation of perceptual noise using spatial frequency adjustments as a function of depth. The top left image shows a depth map of the image while the top right image gives the depth adjusted noise pattern. It is visible that scene elements closer to the observer have a higher spatial frequency than those further away. The lower image in FIG. 5 finally shows the noise print combined with the original scene.

In a further embodiment, high spatial frequency components in applied noises may be overemphasized or underemphasized to cause visual perceptions of increased or decreased perceived depths. For example, instead of linearly scaling spatial frequency components in the applied noises, spatial frequency components in the applied noises may be non-linearly scaled to overemphasize high spatial frequency components to cause a visual perception of a steeper or exaggerated change of spatial resolution thus a visual perception of larger depth (in the z-axis) than is stereoscopically visible. This technique may be used to help alleviate headaches and nausea caused by the disparity between a perceived depth and the actual accommodation point (e.g., the image rendering screen).

In some embodiments, displacement/disparity (in horizontal plane perpendicular to the z-axis) of corresponding pixels in two corresponding LE and RE images may be linearly proportional to the depth of a location represented by the corresponding pixels. Human eyes may accommodate to perceive objects at an accommodation plane, which may be but is not limited to, a display screen, display eyeglasses, etc. Scaling displacement of pixels linearly with depth may cause objects to be perceived as jumping too closely to the viewer, causing an uneasy feeling in the viewer. Similarly, objects away from the accommodation plane may be perceived as fading away too quickly.

In some embodiments, in order to alleviate or avoid these psycho-perceptual issues, displacement/disparity of corresponding pixels may be scaled nonlinearly with the actual depth of the point represented by the corresponding pixels. In some embodiments, limit functions that never actually reach certain maximum limits may be used to relate the displacement/disparity with the depth. In some embodiments, z values may be compressed (e.g., the depth perspective may be foreshortened into an interval that allows the viewer to have a perceptual feeling of being a safe observer). In some embodiments, z values may be expanded (e.g., for the purpose of deliberately causing a particular viewer reaction).

In some embodiments, information about a particular viewing environment may be received by an image processing system as described herein. The viewing environment information may be used to relate depth information with displacement/disparity information. For example, a head-tracking mechanism may be deployed within or in conjunction with the image processing system to determine geometric relationships of a viewer relative to an image rendering screen. These geometric relationships may include but are not limited to the viewing distance, the viewing angle, etc. These geometric relationships may be used in determining how displacement/disparity of corresponding pixels is related to a depth of the point represented by the corresponding pixels.

Under techniques as described, desired noise patterns or prints may be applied in various embodiments in which displacement/disparity may be related to the depth in any one or more of a wide variety of different ways, including but not limited only to, those as discussed above.

7. SYSTEM CONFIGURATIONS

As discussed herein, noises embedded in LE and RE images of a stereo image pair (e.g., related to a real footage) such as illustrated in FIG. 1A and FIG. 1B may not spatially or perceptually match between the LE image and the RE image. As noted, in some embodiments, embedded noises in LE and RE images in a stereo image pair may be first removed or reduced. In some embodiments, embedded noises may include but are not limited only to, noises perceptually incorrectly applied by image processing or acquisition devices. In some embodiments, previously applied noises may also be removed or reduced under the techniques as described herein.

In some embodiments, a desired noise pattern or print may be computationally applied or reapplied to the stereo image pair. The desired noise pattern or print may include but is not limited only to one creating a classic film stock grain. LE and RE noise patterns respectively applied to the LE and RE images may be derived from the same desired noise pattern. For example, the LE noise pattern applied to the LE image may be adjusted with the same offsets as the underlying pixels of the LE image relative to corresponding pixels in a reference image or alternatively in the RE image. Similarly, the RE noise pattern applied to the RE image may be adjusted with the same offsets as the underlying pixels of the RE image relative to corresponding pixels in the reference image or the LE image (e.g., when the LE image is selected as the reference image).

FIG. 6A illustrates an example image processing system 600 that implements at least some of the techniques as described herein, in accordance with an embodiment. In an embodiment, the image processing system (600) generally represents a single device or multiple devices that are configured to process 3D images. In an embodiment, as illustrated in FIG. 6A, the image processing system (600) may comprise a noise application unit (602), a depth information unit (606), and a noise pattern generation unit (608).

In an embodiment, the image processing system 600 is configured to receive a stereo image comprising an LE image (604-L) and an RE image (604-R).

In an embodiment, the depth information unit (606) generally represents any hardware and/or software configured to receive two or more input images or frames representing different perspectives/views of a 3D image or scene to produce per-pixel displacements between two different images (e.g., LE image 604-L and RE image 604-R) of a stereo image pair as depth information (612) and to provide the depth information (612) to other units or devices (e.g., noise application unit 602). In some embodiments, the depth information (612) may be provided by the depth information unit (606) in the form of a disparity map. In an embodiment, the depth information (612) produced by a depth information unit (606) as described herein may include both per-pixel displacements, reference image information, other disparity-related information, or other image feature information constructed based on the per-pixel displacements.

In an embodiment, the noise pattern generation unit (608) corresponds to any device configured to generate one or more noise patterns (610) to be applied to a 3D image or scene represented by the LE image (604-L) and the RE image (604-R) and to provide the noise patterns (610) to other units or devices (e.g., noise application unit 602). In some embodiments, the noise patterns (612) may comprise a plurality of applied noise portions to be applied to individual pixels or individual pixel groups. In some embodiments, the image processing system (600), or the noise pattern generation unit (608), is configured to accept a user input (e.g., through a button on the image processing system 600, through a remote operably linked with the image processing system 600, or through a user interface provided by the image processing system 600) that specifies which one or more noise patterns are to be applied; the noise pattern generation unit (608) is configured to generate, based on the user input, the one or more noise patterns (610).

In an embodiment, the noise application unit (602) corresponds to any device configured to receive stereo image pairs (one of which may be the stereo image pair comprising the LE image 604-L and the RE image 604-R), depth information (e.g., the depth information 612 associated with or determined from the LE image 604-L and the RE image 604-R), and applied noise information (e.g., the noise patterns 610 to be applied to the LE and RE images in the stereo image pair). The noise application unit (602) may be further configured to apply the noise patterns (610), based at least in part on the depth information (612), to the LE and RE images (604-L and 604-R) to generate a noise applied LE image (614-L) and a noise applied RE image (614-R).

In some embodiments, the noise application unit (602) may first apply the noise patterns (610) to one (e.g., the LE image 604-L) of the LE and RE images (604-L and 604-R), without adjusting the noise patterns (610) using the depth information (612) to generate a corresponding noise applied image (the noise applied LE image 614-L in the present example). The noise application unit (602) may generate adjusted noise patterns based on the noise patterns (610) and the depth information (612). The adjusted noise patterns may be obtained by adding offsets to noise patterns (61) using the per-pixel disparity information in the depth information (612). The noise application unit (602) may be configured to apply the adjusted noise patterns to the other (the RE image 604-R in the present example) of the LE and RE images (604-L and 604-R) to generate another corresponding noise applied image (the noise applied RE image 614-R in the present example). The offsets may be so chosen that when the noise patterns (612) are viewed (with the noise applied LE image 614-L in the present example) in a first perspective (left eye in the present example) and the adjusted noise patterns are viewed (with the noise applied RE image 614-R in the present example) in a second different perspective (right eye in the present example) resultant 3D noise patterns thus perceived match the 3D positions of 3D objects or image features in the 3D image or scene.

In some embodiments, the noise application unit (602) may first apply the noise patterns (610) to a reference image without adjusting the noise patterns (610) using the depth information (612). The reference image may represent a different view of the 3D image or scene and may be neither of the LE and RE images (604-L and 604-R). In some embodiments, necessary information for constructing the reference image may be included in the depth information (612). The noise application unit (602) may generate adjusted noise patterns based on the noise patterns (610) and the depth information (612) for the LE and RE images (604-L and 604-R), respectively. The adjusted noise patterns for each of the LE and RE images (604-L and 604-R) may be obtained by adding offsets to noise patterns (61) using the per-pixel disparity information in the depth information (612) for the each of the LE and RE images (604-L and 604-R). The noise application unit (602) may be configured to apply the adjusted noise patterns to each of the LE and RE images (604-L and 604-R) to generate each of the corresponding noise applied images (614-L and 614-R). The offsets may be so chosen that when the adjusted noise patterns are viewed (with the noise applied LE and RE images 614-L and 614-R) in their respective perspectives, resultant 3D noise patterns thus perceived match the 3D positions of 3D objects or image features in the 3D image or scene.

In an embodiment, the noise application unit (602) may be further configured to vary or adjust the mix of spatial frequency components in the applied noises based on a relationship to the depth in the z-axis. For example, the noise application unit (602) may shift spatial frequencies of the applied noises to higher values or increase magnitudes of high spatial frequency components in the applied noises relative to those of low spatial frequency components in the applied noises, dependent on the relationship to the depth in the z-axis. The relationship to the depth in the z-axis may comprise one or more z-dependent relationships that are linear, non-linear, monotonically increasing, monotonically decreasing, non-monotonic, continuous, algebraic, non-algebraic, etc.

In some embodiments, the image processing system (600), or the noise application unit (602), is configured to accept a user input (e.g., through a button on the image processing system 600, through a remote operably linked with the image processing system 600, through a user interface provided by the image processing system 600, etc.) that specifies which relationship is to be used in scaling spatial frequency components in the applied noises; the noise application unit (602) is configured to scale or adjust spatial frequencies or the mix of spatial frequency components in applying the desired noise patterns or prints to the stereo image pair.

In some embodiments, a particular section (front, center, back, or a salient part of the 3D scene, etc.) of the z-axis may be overemphasized or underemphasized with relatively high or low spatial frequency components in the applied noises in relation to other sections of the z-axis.

In some embodiments, applied noises may be applied to entire frames of LE and RE images forming a stereo image pair. For example, a noise pattern or print may be applied to all 3D image features or objects in a 3D image. In some embodiments, applied noises may be applied to only one or more parts, but not all, of the entire frames of such LE and RE images. For example, a noise pattern or print may be applied to a specific 3D image feature or object in a 3D image.

For the purpose of illustration only, it has been illustrated that a depth information unit (606) in an image processing system (600) produce per-pixel displacements between two different images (e.g., LE image 604-L and RE image 604-R) of a stereo image pair as depth information (612). It should be noted that various other ways may be additionally, optionally, or alternatively, used by the image processing system (600) to determine depth information (612).

FIG. 6B illustrates an alternative system configuration of the image processing system (600), in accordance with an embodiment. As shown, the depth information (612) may be provided as a part of input image data along with an input stereo image pair comprising an LE image (604-L) and an RE image (604-R). For example, the depth information (612) may be provided as a part of image metadata in the form of a disparity map comprising depth information needed for applying desirable noise patterns or prints.

For the purpose of illustration only, it has been illustrated that a depth information unit (608) in an image processing system (600) produce one or more noise patterns (610) to be applied to a stereo image pair. It should be noted that various other ways may be additionally, optionally, or alternatively, used by the image processing system (600) to determine the one or more noise patterns (610).

FIG. 6C illustrates an alternative system configuration of the image processing system (600), in accordance with an embodiment. As shown, the one or more noise patterns (610) may be determined from input image data comprising an input stereo image pair of an LE image (604-L) and an RE image (604-R). In an example, the noise patterns (610) may be provided as a part of image metadata in the input image data. In another example, the noise patterns may be decoded or determined from at least a part of noises embedded with the LE image (604-L) and the RE image (604-R).

For the purpose of illustration only, it has been illustrated that an image processing system (600) receives, as input, a stereo image pair comprising an LE image (604-L) and an RE image (604-R). It should be noted that various other ways may be additionally, optionally, or alternatively, used by the image processing system (600) to receive or acquire the LE image (604-L) and the RE image (604-R).

Figure 6D:
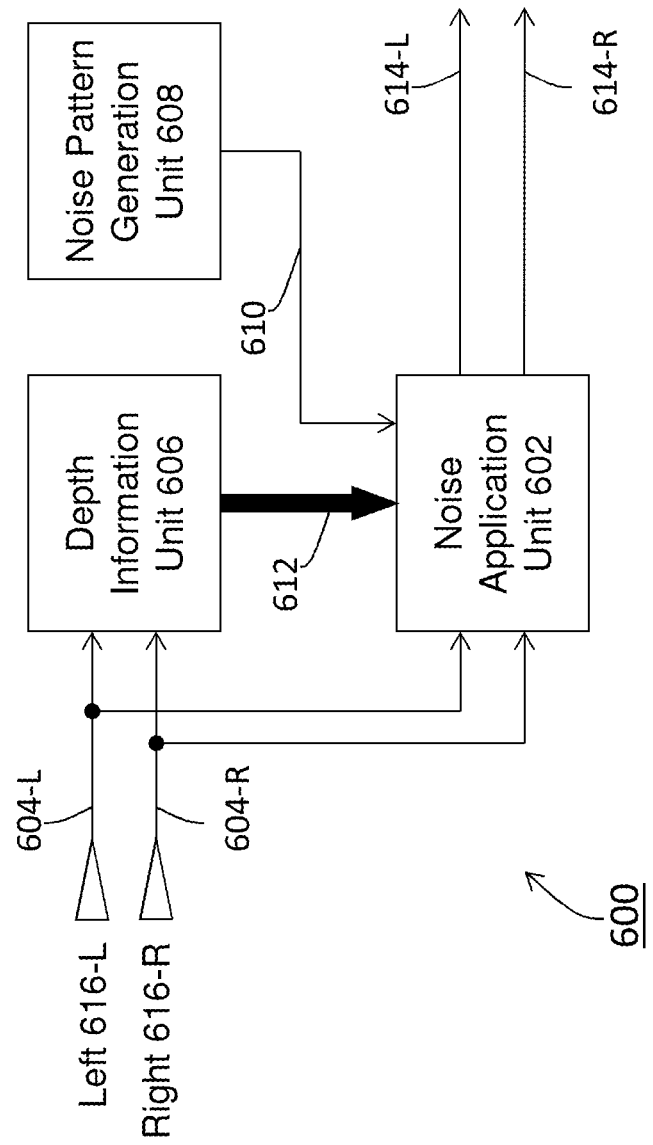

FIG. 6D illustrates an alternative system configuration of the image processing system (600), in accordance with an embodiment. As shown, the image processing system (600) may comprise a camera unit comprising a left camera (616-L) and a right camera (616-R), which may be configured to acquire the LE image (604-L) or the RE image (604-R) from reality.

In an embodiment, the left camera (616-L) or the right camera (616-R) corresponds to any device configured to acquire images in terms of field raw source frames As used herein, "field raw source frames" may refer to a version of images captured from a reality in image planes (or film planes) of image acquisition devices present in the reality; the field raw source frames (or simply source frames) may be, but not limited to, a high-quality version of original images that portray the reality. However, in various embodiments, source frames may generally refer to a version of initial frames that are to be edited, upsampled, downsampled, and/or compressed, along with possible metadata, into input images to other image processing units or devices. In some embodiments, the field raw source frames may include artificially created, artificially enhanced, or synthesized image frames. In the present example, the source frames may be captured from a camera system with a high sampling rate that is typically used by a professional, an art studio, a broadcast company, a high-end media production entity, etc. In various embodiments, the camera unit may comprise two or more image acquisition devices each of which may be a single camera element (e.g., the left camera 616-L or the right camera 616-R) configured to capture a specific view of a reality. Example of image acquisition devices may include, but are not limited to, a left camera (616-L) and a right camera (616-R) as illustrated, where the camera unit may be a stereo camera system. In some embodiments, disparity and/or depth information and/or parallactic information may be generated by the camera unit comprising the camera (616-L) and the right camera (616-R) and provided to other image processing units or devices. In some embodiments, the camera unit may be configured to acquire and communicate geometry information related to optical configurations of the image acquisition devices to other parts of the image processing system (100). Examples of geometry information (120) may include, but are not limited to, information related to positions and/or offsets of principal points and parallaxes in optical configurations of the image acquisition devices as functions of time.

8. PROCESS FLOW

FIG. 7 illustrates an example process flow according to an example embodiment of the present invention. In some example embodiments, one or more computing devices or components may perform this process flow. In block 710, an image processing system (e.g., 600 as illustrated in FIG. 6A through FIG. 6D) receives a left eye (LE) image and a right eye (RE) image that represent a 3D image.

In block 720, the image processing system (600) determines, based on depth information relating to the LE and RE image, one or more first depths of a first 3D image feature in the 3D image.

In block 720, the image processing system (600) applies one or more noise patterns to the first 3D image feature in the 3D image based on the one or more first depths of the first 3D image feature in the 3D image.

In some embodiments, the image processing system (600) may be further configured to perform: determining, based on the depth information relating to the LE and RE image, one or more second depths of a second 3D image feature in the 3D image; and applying the one or more noise patterns to the second 3D image feature in the 3D image based on the one or more second depths of the second 3D image feature in the 3D image; wherein the one or more noise patterns are applied to the first 3D image feature with one or more first spatial frequency components that are different from one or more second spatial frequency components with which the one or more noise patterns are applied to the second 3D image feature.

In some embodiments, the first 3D image feature is closer to a viewer of the 3D image than the second 3D image feature; and the one or more first spatial frequency components comprise more high spatial frequency components than the one or more second spatial frequency components.

In some embodiments, the first 3D image feature is closer to a viewer of the 3D image than the second 3D image feature; and the one or more first spatial frequency components comprise fewer high spatial frequency components than the one or more second spatial frequency components.

In some embodiments, the image processing system (600) may be further configured to perform: overemphasizing one or more high spatial frequency components in the one or more noise patterns to a 3D image feature in the 3D image, wherein the 3D image feature is closer to a viewer than other 3D image features in the 3D image.

In some embodiments, the image processing system (600) may be further configured to perform: analyzing the LE and RE images; and computing the depth information based on results of analyzing the LE and RE images.

In some embodiments, the image processing system (600) may be further configured to perform: receiving image metadata associated with the LE and RE images; and retrieving the depth information from the image metadata associated with the LE and RE images.

In some embodiments, the LE and RE images comprise a stereo image pair captured from a reality by a stereoscopic camera system.

In some embodiments, the LE and RE images comprise at least one computer-generated image detail.

In some embodiments, the one or more noise patterns comprises at least one of noise patterns simulating chemical films, analogous chemical properties of silver, chemical film color layers; noise patterns simulating noise characteristics of a specific device; noise patterns simulating a specific texture; watermarks; noises causing an image feature at a certain depth to go up and down, left and right, or in and out spatially; noises altering luminance or colors of an image feature at a certain depth; noise differentially applied in dark and bright areas; noises simulating a variety of response curves, saturation properties, noise properties, devices, and media; or noises with one or more of a variety of different distribution patterns or probability distribution functions.

In some embodiments, the image processing system (600) may be further configured to perform: transforming corresponding LE and RE pixels in the LE image with one or more transfer functions representing the one or more noise patterns.

In some embodiments, the image processing system (600) may be further configured to perform: applying the one or more noise patterns to a plurality of image features in the 3D images at respective depths of the image features.

In some embodiments, the image processing system (600) may be further configured to perform: removing at least a portion of embedded noises in the LE and RE images.

In some embodiments, the one or more noise patterns are applied to the LE and RE images with at least one portion of embedded noises in the LE and RE images remaining in the LE and RE images.

In some embodiments, the image processing system (600) may be further configured to perform: tracking a viewer's geometric relationships relative to an image rendering screen on which the LE and RE images are to be rendered; transforming the LE and RE images based on the viewer's geometric relationships relative to the image rendering screen into a transformed LE image and a transformed RE image; and rendering the transformed LE and RE images on the image rendering screen.

In some embodiments, the image processing system (600) may be further configured to perform: converting one or more input 3D images represented, received, transmitted, or stored with one or more input video signals into one or more output 3D images represented, received, transmitted, or stored with one or more output video signals.

In some embodiments, at least one of the LE and RE images comprises image data encoded in one of: a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space, or a YCbCr color space.

In some embodiments, the image processing system (600) may be further configured to perform: rendering a noise applied LE image and a noise applied RE image, wherein the noise applied LE image is obtained from applying the one or more noise patterns to the LE image, and wherein the noise applied RE image is obtained from applying the one or more noise patterns to the RE image.

Embodiments include an apparatus comprising a processor and configured to perform any one of the foregoing methods as discussed above.

Embodiments include a computer readable storage medium, comprising software instructions, which when executed by one or more processors cause performance of any one of the foregoing methods as discussed above.

9. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
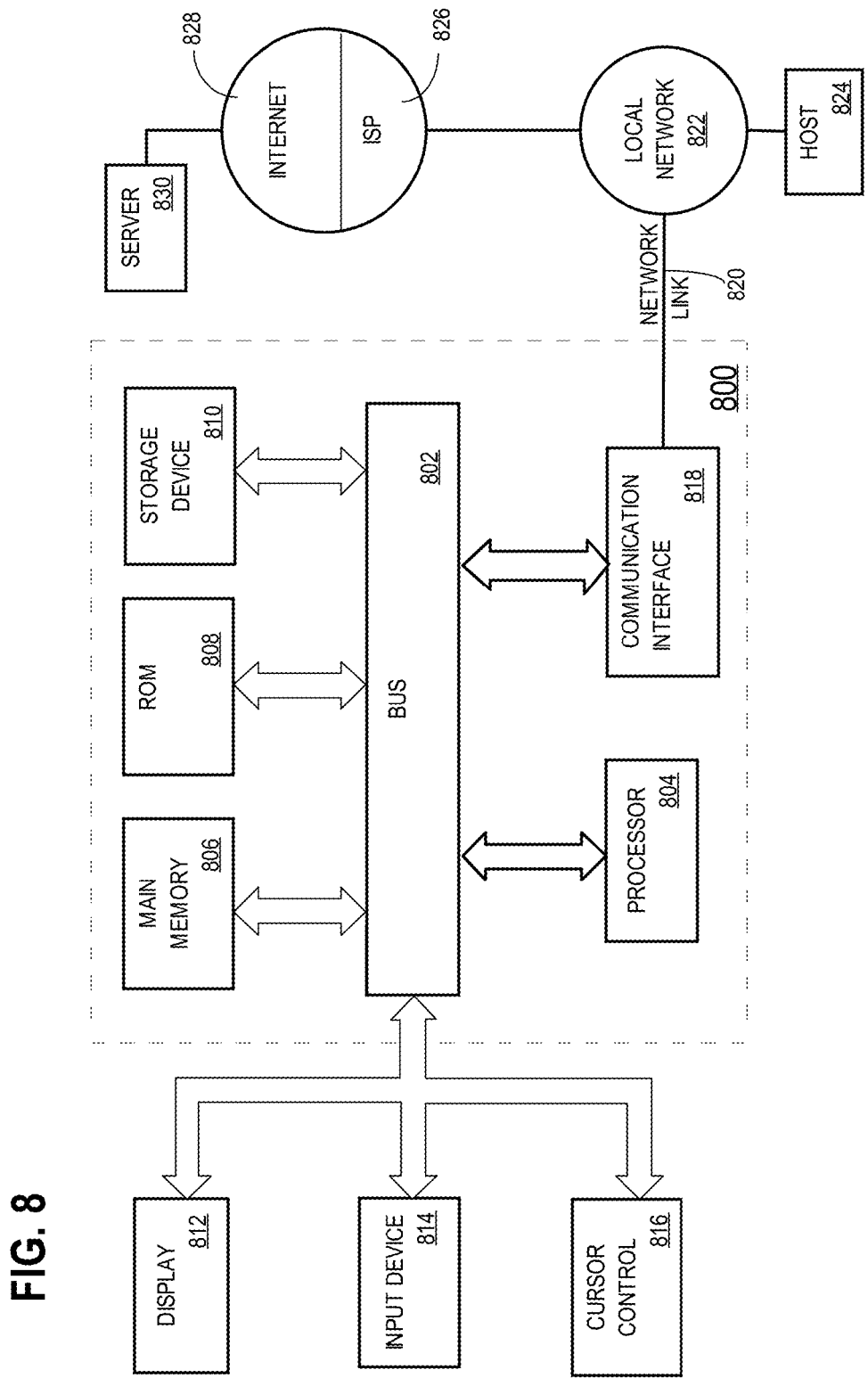
FIG. 8 illustrates an example hardware platform on which a computer or a computing device as described herein may be implemented, according a possible embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

10. EQUIVALENTS, EXTENSIONS, ALTERNATIVES AND MISCELLANEOUS

To illustrate a clear example, images taken from a reality are used to illustrate some aspects of the present invention. It should be noted that other types of images may also be used in embodiments of the present invention. For example, images may be composite frames from two or more different image sources. Furthermore, a part, or a whole, of an image may be sourced from a 2D image, while another part on the same image may be sourced from a 3D or multi-view image. Techniques as described herein may be provided for these other types of images in embodiments of the present invention. To illustrate a clear example, stereoscopic images comprising LE images and RE images are used to illustrate some aspects of the present invention. It should be noted that multi-view images may also be used in embodiments of the present invention. For example, two images with two different views from a multi-view image that comprises two, three, . . . , 24, or more views may be used in place of a LE image and a RE image in a stereo image. Techniques as described herein may be used to process stereoscopic images as well as multi-view images with more than two views in embodiments of the present invention. In certain embodiments of the present invention, multi-view images can be presented with autostereoscopic reproduction to avoid the use of 3D glasses or other headgear.

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
accessing a left eye (LE) image and a right eye (RE) image that represent a 3D image;
filtering the LE image and the RE image to reduce undesirable noise;
determining, based on depth information relating to the LE and RE image, one or more first depths of a first 3D image feature in the 3D image;
applying, after the filtering, one or more noise patterns to the first 3D image feature in the 3D image based on the one or more first depths of the first 3D image feature in the 3D image;
determining, based on the depth information relating to the LE and RE image, one or more second depths of a second 3D image feature in the 3D image; and
applying the one or more noise patterns to the second 3D image feature in the 3D image based on the one or more second depths of the second 3D image feature in the 3D image;
wherein the one or more noise patterns are applied to the first 3D image feature with one or more first spatial frequency components that are different from one or more second spatial frequency components with which the one or more noise patterns are applied to the second 3D image feature.

2. The method of claim 1, wherein the first 3D image feature is closer to a viewer of the 3D image than the second 3D image feature, and wherein the one or more first spatial frequency components comprise more high spatial frequency components than the one or more second spatial frequency components.

3. The method of claim 1, wherein the first 3D image feature is closer to a viewer of the 3D image than the second 3D image feature, and wherein the one or more first spatial frequency components comprise fewer high spatial frequency components than the one or more second spatial frequency components.

4. A method comprising:
accessing a left eye (LE) image and a right eye (RE) image that represent a 3D image;
filtering the LE image and the RE image to reduce undesirable noise;
determining, based on depth information relating to the LE and RE image, one or more first depths of a first 3D image feature in the 3D image;
applying, after the filtering, one or more noise patterns to the first 3D image feature in the 3D image based on the one or more first depths of the first 3D image feature in the 3D image;
overemphasizing one or more high spatial frequency components in the one or more noise patterns to a 3D image feature in the 3D image, wherein the 3D image feature is closer to a viewer than other 3D image features in the 3D image.

5. The method of claim 4, further comprising:
analyzing the LE and RE images; and
computing the depth information based on results of analyzing the LE and RE images.

6. The method of claim 4, further comprising:
receiving image metadata associated with the LE and RE images; and
retrieving the depth information from the image metadata associated with the LE and RE images.

7. The method of claim 4, wherein the LE and RE images comprise a stereo image pair captured from a reality by a stereoscopic camera system.

8. The method of claim 4, wherein the LE and RE images comprise at least one computer-generated image detail.

9. The method of claim 4, wherein the one or more noise patterns comprises at least one of (a) noise patterns simulating chemical films, analogous chemical properties of silver, chemical film color layers, (b) noise patterns simulating noise characteristics of a specific device; noise patterns simulating a specific texture, (c) watermarks, (d) noises causing an image feature at a certain depth to go up and down, left and right, or in and out spatially, (e) noises altering luminance or colors of an image feature at a certain depth, (f) noise differentially applied in dark and bright areas; noises simulating a variety of response curves, saturation properties, noise properties, devices, and media, and (g) noises with one or more of a variety of different distribution patterns or probability distribution functions.

10. The method of claim 4, further comprising applying the one or more noise patterns to a plurality of image features in the 3D images at respective depths of the image features.

11. The method of claim 4, further comprising removing at least a portion of embedded noises in the LE and RE images.

12. The method of claim 4, wherein the one or more noise patterns are applied to the LE and RE images with at least one portion of embedded noises in the LE and RE images remaining in the LE and RE images.

13. The method of claim 4, wherein the LE image and the RE image are selected from an autostereoscopic image that comprises two or more images in different views.

14. An apparatus comprising a processor and configured to perform the method recited in claim 4.

15. A non-transitory computer readable storage medium, storing software instructions, which when executed by one or more processors cause performance of the method recited in claim 4.

16. A method comprising:
    receiving a left eye (LE) image and a right eye (RE) image that represent a 3D image;
    determining, based on depth information relating to the LE and RE image, one or more first depths of a first 3D image feature in the 3D image; and
    applying one or more noise patterns to the first 3D image feature in the 3D image based on the one or more first depths of the first 3D image feature in the 3D image,
    wherein a spatial frequency of the one or more noise patterns is dependent on the depth information;
    determining, based on the depth information relating to the LE and RE image, one or more second depths of a second 3D image feature in the 3D image; and
    applying the one or more noise patterns to the second 3D image feature in the 3D image based on the one or more second depths of the second 3D image feature in the 3D image;
    wherein the one or more noise patterns are applied to the first 3D image feature with one or more first spatial frequency components that are different from one or more second spatial frequency components with which the one or more noise patterns are applied to the second 3D image feature.

17. The method of claim 16, wherein the first 3D image feature is closer to a viewer of the 3D image than the second 3D image feature, and wherein the one or more first spatial frequency components comprise more high spatial frequency components than the one or more second spatial frequency components.

18. The method of claim 16, wherein the first 3D image feature is closer to a viewer of the 3D image than the second 3D image feature, and wherein the one or more first spatial frequency components comprise fewer high spatial frequency components than the one or more second spatial frequency components.

19. A method comprising:
    receiving a left eye (LE) image and a right eye (RE) image that represent a 3D image;
    determining, based on depth information relating to the LE and RE image, one or more first depths of a first 3D image feature in the 3D image; and
    applying one or more noise patterns to the first 3D image feature in the 3D image based on the one or more first depths of the first 3D image feature in the 3D image,
    wherein a spatial frequency of the one or more noise patterns is dependent on the depth information;
    overemphasizing one or more high spatial frequency components in the one or more noise patterns to a 3D image feature in the 3D image, wherein the 3D image feature is closer to a viewer than other 3D image features in the 3D image.

20. The method of claim 19, wherein the LE image and the RE image are selected from an autostereoscopic image that comprises two or more images in different views.

* * * * *